United States Patent Office 2,855,746
Patented Oct. 14, 1958

2,855,746

ADJUSTABLE HAND RAKE

Philip Lambert Miller, Sr., Florissant, Mo.

Application May 20, 1957, Serial No. 660,361

1 Claim. (Cl. 56—400.19)

This invention relates to hand manipulated garden tools generally, and more particularly to a rake wherein the angular relationship between the handle and the fork member may be adjustably varied to best meet the needs of rake use from time to time, as they occur.

The invention has among its objects the production of such a device that will be simple and sturdy in construction, easy to make and use, economical, and satisfactory for efficient use wherever its use is deemed applicable.

One of the principal objects of my invention is to so construct such a device that the same may be manipulated while holding its handle in the most comfortable manner and without undue stooping, crouching and similar body contortions in the use of the device, this result being obtained through so mounting the rake fork element to the handle to be readily angularly adjustable to thereby present the free ends of the fork tines at the best possible angle for the particular kind of raking operation about to be done at the time.

Many other objects and advantages of the construction shown and described will be obvious to those skilled in the art to which the invention appertains, as will be more clearly evident from the disclosures hereinafter given.

To this end, my invention consists in the novel construction, arrangement and combination of parts herein shown and described, and the uses mentioned, all as will be more clearly pointed out in the claim hereunto appended.

Figure 1:
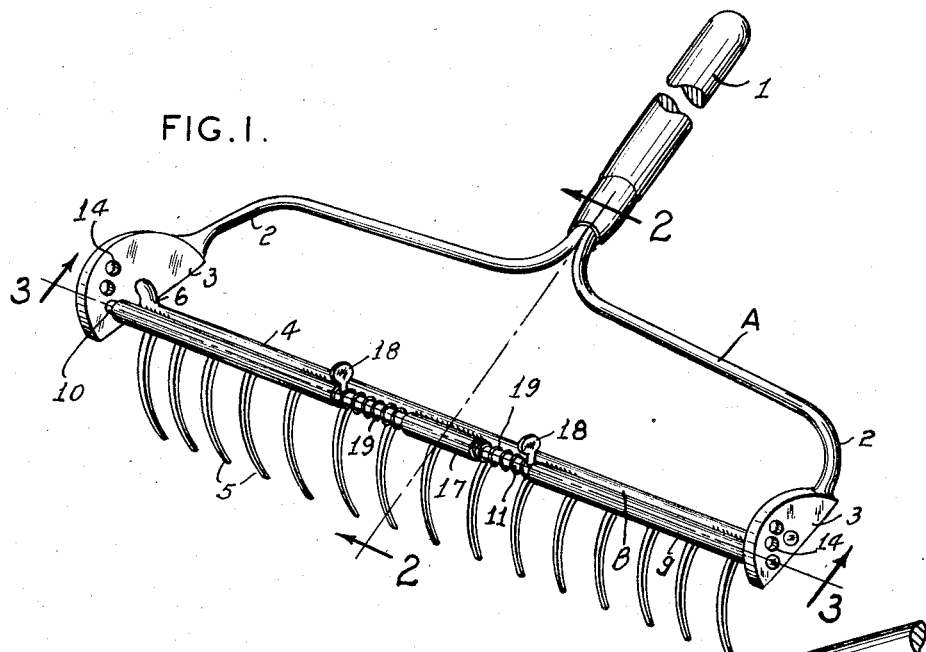
Figure 2:
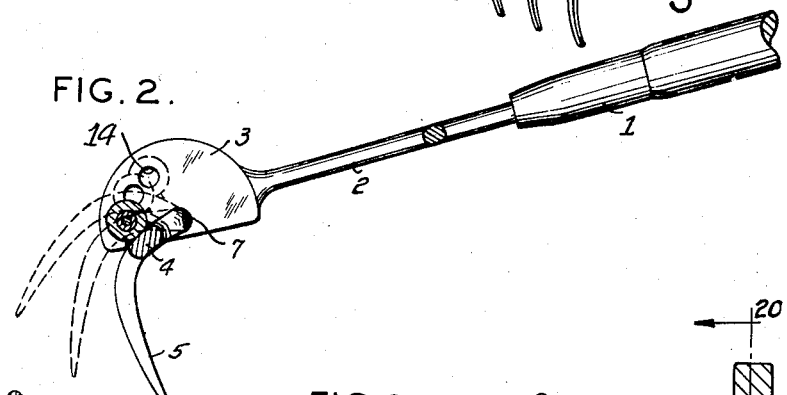
Figure 3:
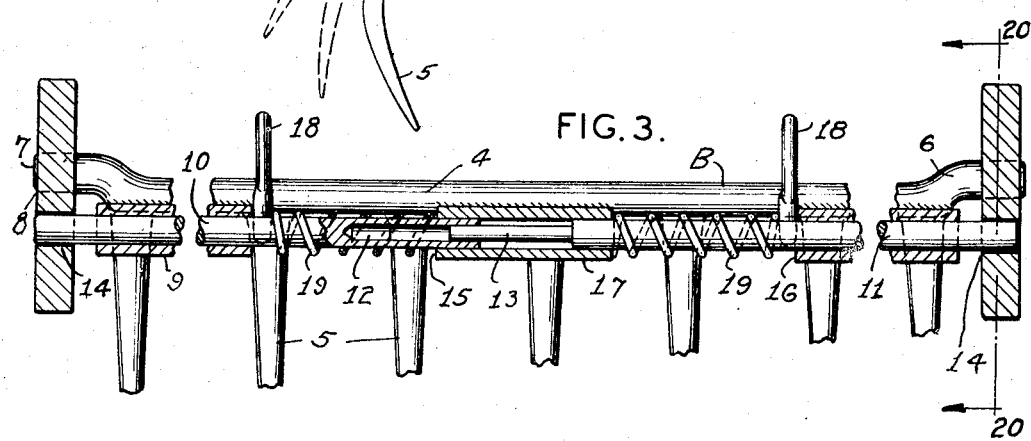

In the drawings, wherein like reference characters represent like or corresponding parts throughout the views, Figure 1 is a perspective view of the device, shown in one adjusted position ready for use;

Figure 2 is an enlarged cross-sectional view, taken substantially along the line 2—2 of Fig. 1, and showing other adjusted positions; and Figure 3 is an enlarged cross-sectional view, taken substantially along the line 3—3 of Fig. 1.

Referring more particularly to the drawings, wherein I have shown a preferred embodiment of the invention, 1 indicates the elongated handle of the garden rake, having a frame member A fixedly carried at one end thereto, and having the pair of side arms spaced apart transversely as indicated at 2—2, and in this instance having fork carrying enlargements 3—3 at their terminal ends.

The usual garden rake is similarly provided with an elongated handle, but the rake or fork portion thereof is set at a predetermined fixed angle relative to the handle so that the tines of the fork are approximately at right angles to the longitudinal axis of the handle. Thus, when any raking is needed to be done that would be best performed if the tines were at a differently set angle, as for instance in raking directly against an upright wall, or even from under an obstacle, it is not only necessary that the rake user stoop or bend at an awkward position for such raking, but even then, the tines would not be at the best angle for most efficiently performing these oft-occurring raking requirements.

In the instant invention, this difficulty has been overcome, by so mounting the fork to the rake frame, that that the former is variably adjustable to any one of multiple angular relationships to the handle, and as will be hereinafter described.

To this purpose, the fork proper B, having the cross bar 4 to which the series of aligned tines 5—5 are mounted, has its ends 6—6 preferably slightly offset to provide the pair of stub axles 7—7 that are rotatably received in the bearing holes 8—8 provided in the enlargements 3—3 of the frame so as to be journalled thereat.

Obviously, with any rotational movement of the fork, about the journalled ends, the tines extend at an angle that varies with the degree of rotational adjustment, relative to the frame.

In order to releasably latch the fork in any of its adjusted positions, as indicated in the full and dotted lines in Fig. 2, most clearly, the fork may have a sleeve 9 mounted on the cross-bar 4 and extending longitudinally therealong, somewhat as indicated, and means may be slidably movable in said sleeve, cooperating with co-operating means on said elements 3—3, to maintain said fork and handle frame in their variously adjusted relationships.

A pair of rod elements 10 and 11 are arranged to be slidably movable within said sleeve, the opposed ends of said elements being telescopically cooperating, as by providing a longitudinally extending recess 12 opening inwardly from the said end of one of said pair of rod elements, to slidably telescopically receive a diametrally reduced pin portion 13 extending from the said end of the other of said pair of rod elements, thereby permitting the overall length between the outermost ends 20—20 of said pair of rod elements to be extended or shortened, as required for the purposes of adjustment.

A series of apertures 14—14 are provided in the enlarged portions 3—3 of the frame, arranged in circumferential sequence, and all being at the same distance from the bearing holes 8—8 that the rod elements 10 and 11 are from the stub axle axes. Now, when the fork is rotatably adjustably moved to any position indicated, the ends of the elements 10 and 11 will be in registry with the apertures 14—14 for interlocking therewith.

For most conveniently and positively operating said pair of rod elements to cooperate with the series of rod-receiving apertures in the frame, the sleeve 9 may have a portion of its length interrupted to provide the open portions 15 and 16 spaced apart by the intermediate portion 17 of the sleeve.

Thumb-engageable elements 18—18 are carried by the rod elements 10 and 11, to extend laterally therefrom, and normally abut against the far ends of said open portions 15 and 16, and springs or other suitable yieldably resilient elements 19—19 are mounted on said rod elements to abut at their opposite ends with the sleeve portion 17 and the opposed end wall of the outer ends of the said sleeve.

In this way, all that is required for adjustably varying the angular relationship of the fork to the handle, from any previous position of adjustment, is to press the pair of elements 18—18 inwardly toward one another, thereby disengaging the rod ends from their seats in the apertures 14—14, to permit the desired degree of rotational shift of the fork, whereupon releasing of said thumb-engageable elements permits the springs to thereupon shift said pair of rod elements mutually outwardly to re-engage in the apertures, to lock said fork in said intended adjusted position.

I claim:

In a hand garden rake, an elongated handle, a frame at one end thereof and having a pair of laterally spaced-apart ends fixed thereto, a multi-tined fork having its ends rotatably journalled in said frame so that the fork may be tilted whereby the angular relation between said fork and handle may be adjustably varied, said frame having a series of circumferentially spaced-apart apertures therein, a sleeve fixed to extend longitudinally on said fork, a telescopically adjustable rod slidable longitudinally in said sleeve and having ends selectively engageable in said series of apertures to hold said fork in predetermined angular relation to said handle, and spring means independent of said handle and arranged between said sleeve and rod and constantly yieldably urging the ends of said rod into said apertures.

References Cited in the file of this patent

UNITED STATES PATENTS

| | | |
|---|---|---|
| 617,206 | Tveit et al. | Jan. 3, 1899 |
| 1,123,682 | Carroll | Jan. 5, 1915 |
| 1,362,065 | Walker | Dec. 14, 1920 |
| 2,162,648 | Slusher | June 13, 1939 |

FOREIGN PATENTS

| | | |
|---|---|---|
| 323,865 | Great Britain | Jan. 16, 1930 |